(12) United States Patent
Rajauria et al.

(10) Patent No.: US 11,257,525 B1
(45) Date of Patent: Feb. 22, 2022

(54) DATA STORAGE DEVICE PREDICTING FAILURE OF NEAR FIELD TRANSDUCER BASED ON SLOPE OF THERMAL GRADIENT

(71) Applicant: Western Digital Technologies, Inc., San Jose, CA (US)

(72) Inventors: Sukumar Rajauria, San Jose, CA (US); Pierre-Olivier Jubert, San Jose, CA (US); Richard M. Brockie, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/176,282

(22) Filed: Feb. 16, 2021

(51) Int. Cl.
*G11B 11/10* (2006.01)
*G11B 5/00* (2006.01)
*G11B 27/36* (2006.01)

(52) U.S. Cl.
CPC ...... *G11B 27/36* (2013.01); *G11B 2005/0021* (2013.01)

(58) Field of Classification Search
CPC . G11B 5/3912; G11B 2005/0021; G11B 5/39; G11B 5/6082; G11B 5/3136; G11B 5/314; G11B 5/1278; G11B 5/3116; G11B 5/3163; G11B 7/124; G11B 7/1387; G11B 13/08
USPC ...... 360/59, 328, 125.1, 125.2, 125.3, 125.4
See application file for complete search history.

(56) References Cited

U.S. PATENT DOCUMENTS

| | | | |
|---|---|---|---|
| 6,166,536 A | 12/2000 | Chen et al. | |
| 6,304,081 B1 | 10/2001 | Richter | |
| 8,908,483 B1 | 12/2014 | Ren et al. | |
| 9,396,750 B2 | 7/2016 | Chu et al. | |
| 9,837,118 B1 * | 12/2017 | Mader | G11B 20/10398 |
| 10,043,540 B1 | 8/2018 | Yang | |
| 10,147,454 B1 | 12/2018 | Mendonsa et al. | |
| 10,332,553 B1 * | 6/2019 | Staffaroni | G11B 5/314 |
| 10,339,963 B1 | 7/2019 | Mader et al. | |
| 10,699,736 B1 | 6/2020 | Rajauria et al. | |

OTHER PUBLICATIONS

Hai Li, "Storage Physics and Noise Mechanism in Heat-Assisted Magnetic Recording," Carnegie Mellon University. Thesis. Sep. 2016. https://doi.org/10.1184/R1/6723209.v1.
M. J. Vos, Y. Tanaka and J. H. Judy, "Measurements and modelling of noise in DC-erased thin-film media," in IEEE Transactions on Magnetics, vol. 26, No. 5, pp. 2149-2151, Sep. 1990 . . . .
G. J. Tarnopolsky, L. T. Tran, A. M. Barany, H. N. Bertram and D. R. Bloomquist, "DC modulation noise and demagnetizing fields in thin metallic media," in IEEE Transactions on Magnetics, vol. 25, No. 4, pp. 3160-3165, Jul. 1989.

(Continued)

*Primary Examiner* — Nabil Z Hindi
(74) *Attorney, Agent, or Firm* — Patterson & Sheridan, LLP; Steven H. Versteeg

(57) ABSTRACT

A data storage device is disclosed comprising a head actuated over a magnetic media, wherein the head comprises a laser and a near field transducer (NFT). A thermal gradient produced in the magnetic media by the NFT is periodically measured, and a failure of the NFT is predicted based on a slope of the thermal gradient measurements.

17 Claims, 3 Drawing Sheets

(56) References Cited

OTHER PUBLICATIONS

T. D. Trinh, S. Rajauria, R. Smith, E. Schreck, Q. Dai and F. E. Talke, "Temperature-Induced Near-Field Transducer Failure in Heat-Assisted Magnetic Recording," in IEEE Transactions on Magnetics, vol. 56, No. 6, pp. 1-4, Jun. 2020.

I. Gilbert, D. A. Saunders, P. Czoschke, Z. Liu, S. Granz and T. Rausch, "Measuring Cross-Track Thermal Gradient in Heat-Assisted Magnetic Recording," in IEEE Transactions on Magnetics, vol. 55, No. 12, pp. 1-5, Dec. 2019.

Shaomin Xiong, Robert Smith, Jian Xu, Shuji Nishida, Masaru Furukawa, Kenji Tasaka, Kenji Kuroki, Yeoungchin Yoon, Na Wang, Sripathi Canchi, Erhard Schreck, and Qing Dai, "Setting Write Spacing in Heat Assisted Magnetic Recording," in IEEE Transactions on Magnetics, vol. 54, No. 8, pp. 1-7, Aug. 2018.

I. Gilbert, Z. Liu, X. Zheng, S. Granz, W. Eppler and T. Rausch, "Measuring Thermal Gradient in HAMR Using Pseudorandom Bit Sequences," in IEEE Transactions on Magnetics, vol. 55, No. 3, pp. 1-6, Mar. 2019.

H. J. Richter, C. C. Poon, G. Parker, M. Staffaroni, O. Mosendz, R. Zakai, and B. C. Stipe, "Direct Measurement of the Thermal Gradient in Heat Assisted Magnetic Recording," in IEEE Transactions on Magnetics, vol. 49, No. 10, pp. 5378-5381, Oct. 2013.

\* cited by examiner

DATA STORAGE DEVICE PREDICTING FAILURE OF NEAR FIELD TRANSDUCER BASED ON SLOPE OF THERMAL GRADIENT

CROSS REFERENCE TO RELATED APPLICATIONS

This application is related to co-pending U.S. patent application Ser. No. 17/176,302 entitled "DATA STORAGE DEVICE DETECTING WRITE POLE DEGRADATION FOR MAGNETIC WRITE HEAD" and U.S. patent application Ser. No. 17/176,354 entitled "DATA STORAGE DEVICE MEASURING HAMR MEDIA DISTRIBUTIONS," which are hereby incorporated by reference in their entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Data is typically written to the disk by modulating a write current in an inductive coil to record magnetic transitions onto the disk surface in a process referred to as saturation recording. During read-back, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head.

DETAILED DESCRIPTION

Figure 1:
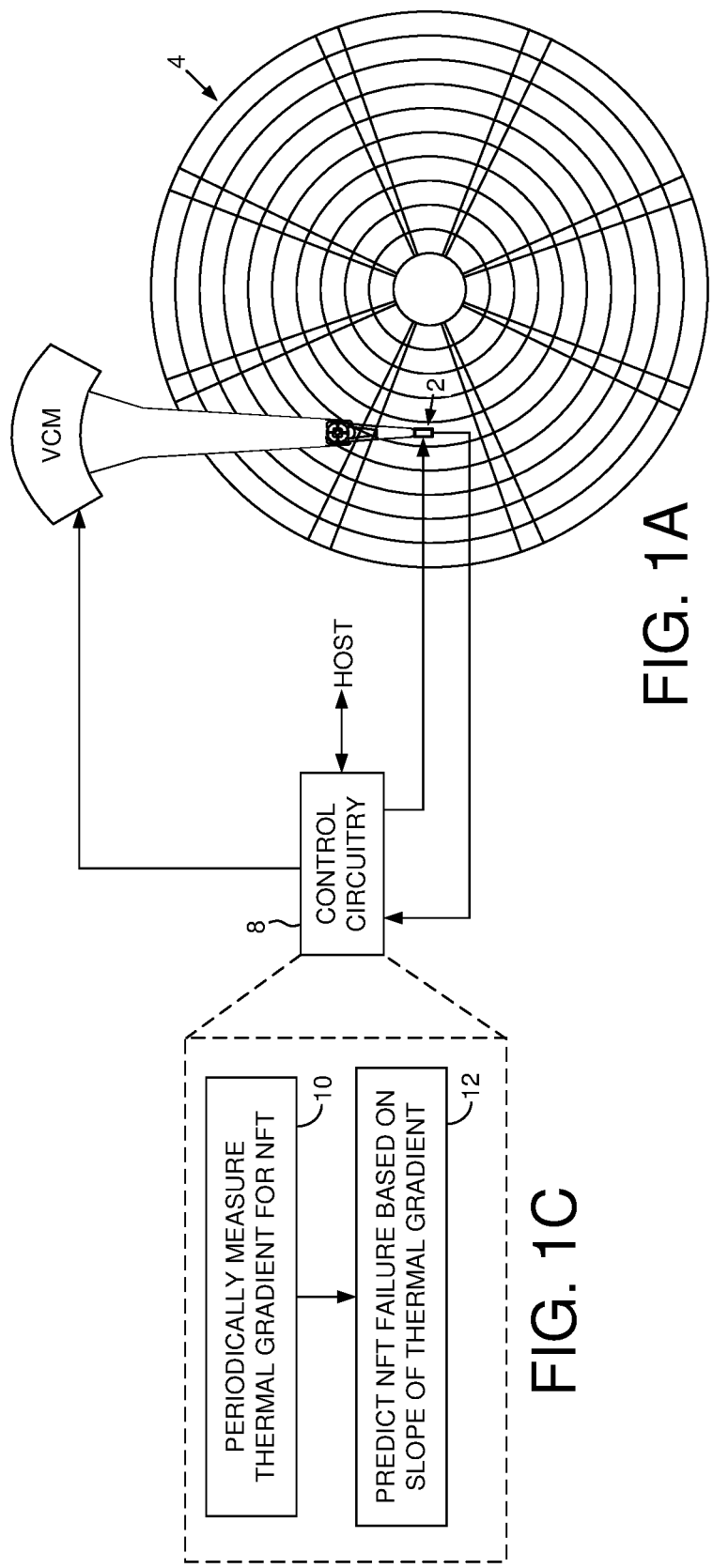
FIGS. 1A and 1B show a data storage device in the form of a disk drive according to an embodiment comprising a head actuated over a disk, wherein the head comprises a laser and a NFT for focusing the laser onto the disk surface.
FIG. 1C is a flow diagram according to an embodiment wherein a thermal gradient for the NFT is periodically measured, and failure of the NFT is predicted based on a slope of the thermal gradient measurements.

FIGS. 1A and 1B show a data storage device in the form of a disk drive according to an embodiment comprising a head 2 actuated over a magnetic media such as a disk 4, wherein the head 2 comprises a laser and a near field transducer (NFT) 6. While a disk drive is used as an illustrative example herein, various embodiments of the invention may be applied to, and/or include, other types of data storage device with magnetic media such as tape drives. The disk drive further comprises control circuitry 8 configured to execute the flow diagram of FIG. 1C, wherein a thermal gradient produced in the magnetic media by the NFT is periodically measured (block 10), and a failure of the NFT is predicted based on a slope of the thermal gradient measurements (block 12).

Figure 2:
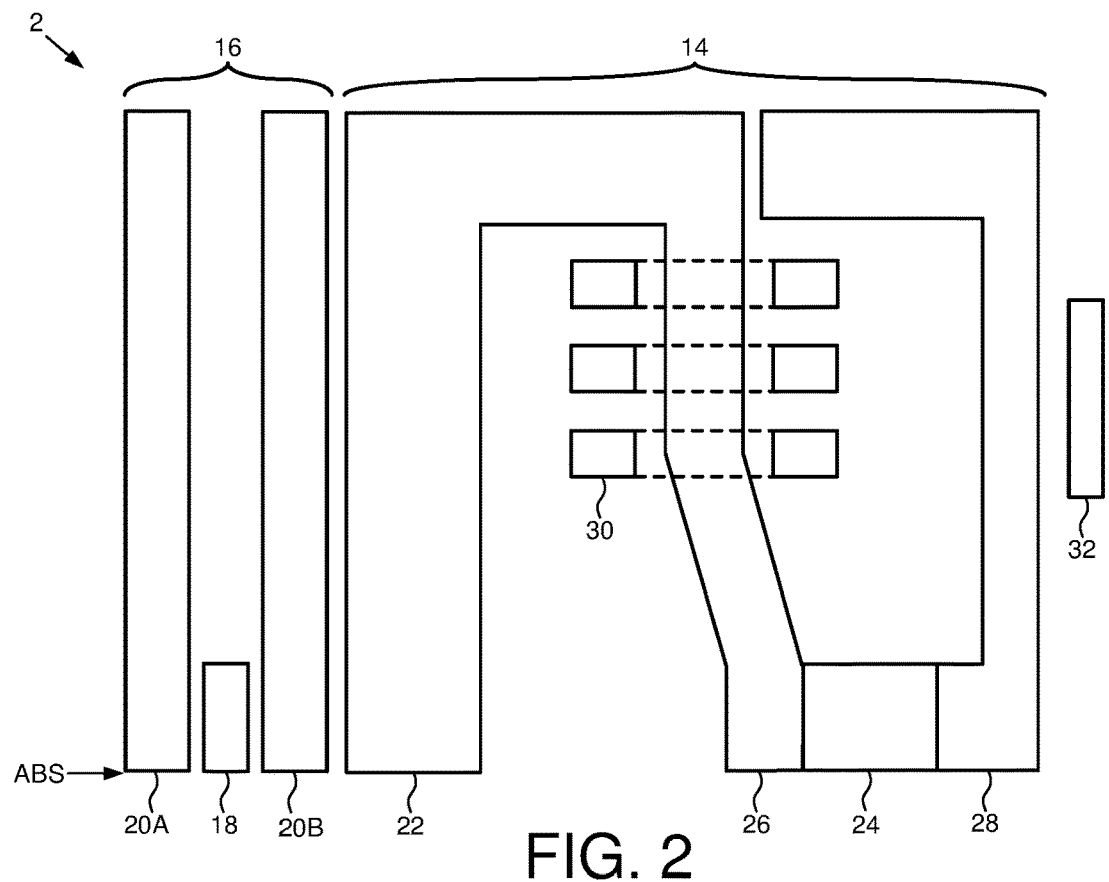
FIG. 2 shows a head according to an embodiment comprising read components and write components including a laser and NFT.

In the embodiment of FIG. 1B, the head 2 comprises a suitable write element 14 such as a write coil and a suitable read element 16 such as a magnetoresistive element. FIG. 2 shows a cross-sectional view of a suitable head 2 according to an embodiment, wherein the head 2 may comprise more or fewer elements in various other embodiments. In the embodiment of FIG. 2, the head 2 comprises write elements 14 configured to write data to the disk surface 4, and read elements 16 configured to read data from the disk surface 4. The bottom surface of the head 2 facing the disk surface 4 is referred to as an air bearing surface (ABS) wherein an air bearing forms between the head 2 and the disk surface 4 due to the disk spinning such that the head 2 effectively flies above the disk surface 4. The read elements 16 of the head 2 may comprise a magnetoresistive (MR) read element 18 that is fabricated between MR shields 20A and 20B. Other embodiments may employ a different read element, such as a suitable magnetic tunneling junction (MTJ) read element. The write elements 14 comprise a return pole 22, a write assist element 24 in the form of a suitable laser (e.g., laser diode) and NFT fabricated between a main pole 26 and a trailing shield 28, and a write coil 30 that excites the main pole 26 to generate a magnetic write field that magnetizes the disk surface 4, thereby writing data to the disk surface 4.

In one embodiment, the NFT may protrude toward the disk surface 4 due to thermal expansion when a bias signal (e.g., current) is applied to the laser during a write operation. In one embodiment, the amplitude of the laser current is calibrated to achieve a desired thermal spot on the surface of the disk 4, thereby enabling the magnetic field generated by the write coil 30 to more readily magnetize the disk surface. In order for the thermal spot to achieve optimal efficacy, in one embodiment a fly height actuator (FHA) 32 is biased to achieve a target fly height of the head 2 over the disk surface 4. Any suitable FHA 32 may be employed, such as a suitable thermal actuator that adjusts the fly height through thermal expansion, or a suitable mechanical actuator such as a suitable piezoelectric actuator that adjusts the fly height through mechanical deflection.

In one embodiment, the efficacy of the NFT and corresponding areal density capability in HAMR recording is related to the thermal gradient produced in the magnetic media due to the thermal spot that is focused onto the magnetic media during write operations. A tighter focus of the thermal spot results in a sharper thermal gradient produced in the magnetic media, which enables an increase in areal density in both the cross-track (tracks per inch) and down-track (bits per inch) dimensions. The NFT may degrade over the life of the data storage device due, for example, to thermal degradation of the NFT. As the NFT degrades, the ability to tightly focus the thermal spot onto the surface of the magnetic media degrades, leading to a degradation of the thermal gradient. Eventually the NFT may fail altogether, thereby preventing further write operations to the magnetic media. In addition, the life of the NFT (time until failure) across the heads may vary due to tolerances in materials as well as fabrication process. In one embodiment, this variation in the life of the NFT may be spread over orders of magnitude, for example, ranging from less than a minute to more than a thousand minutes of useful operation. In one embodiment, failure of the NFT may be accurately predicted based on a rate of change of the measured thermal gradient (i.e., the slope of the thermal gradient). For example in an embodiment described below, failure of the NFT may be predicted when the slope of the measured thermal gradient is negative, and when the negative slope exceeds a threshold.

Figure 3:
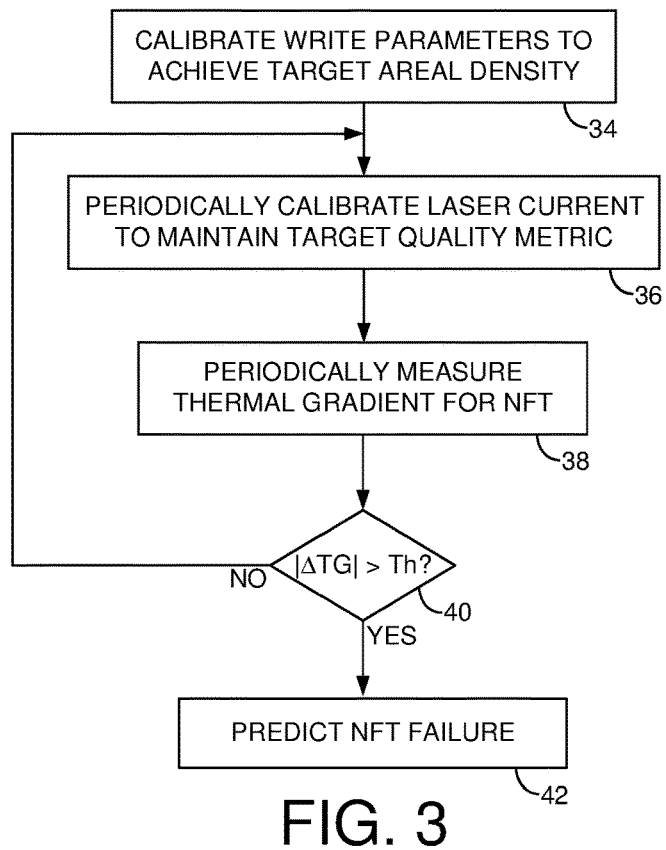
FIG. 3 is a flow diagram according to an embodiment wherein a laser current is periodically calibrated to maintain a target quality metric, and failure of the NFT is predicted when the slope of the thermal gradient exceeds a threshold.

FIG. 3 is a flow diagram according to an embodiment wherein a number of write parameters are calibrated to achieve a target areal density for the magnetic media, which in one embodiment means calibrating a target data track density (tracks per inch or TPI) and/or calibrating a target linear bit density (bits per inch or BPI) (block 34). Any suitable write parameters may be calibrated to achieve the target areal density, such as calibrating an amplitude of a write current applied to a write coil, an amplitude of a laser current applied to a laser, an amplitude of a bias signal applied to a fly height actuator, etc. The write parameters may be calibrated during a manufacturing procedure prior to shipping the data storage device to a customer, or the write parameters may be calibrated after shipping the data storage device (e.g., the target areal density may be configured by the customer). During normal operation (e.g., during manufacturing tests or while deployed in the field), the laser current applied to the laser may be recalibrated in order to maintain a target quality metric for the write operations (e.g., maintain a target magnetic write width or MWW) (block 36). For example, the laser and/or the NFT may degrade over time requiring a recalibration of the laser current in order to maintain a target write quality. Although adjusting the laser current may improve the write quality, in one embodiment a degrading NFT will eventually cause degradation of the thermal gradient produced in the magnetic media. For example even if adjusting the laser current will maintain a target MWW, the thermal gradient produced in the magnetic media may still degrade over time due to a degrading NFT. Accordingly in the flow diagram of FIG. 3, the thermal gradient is periodically measured (block 38), for example, during or after calibrating the laser current at block 36. When the slope of the thermal gradient exceeds a threshold (block 40), a failure of the NFT is predicted (block 42) so that any appropriate action may be taken, such as notifying the host of the potential oncoming failure.

Figure 4:
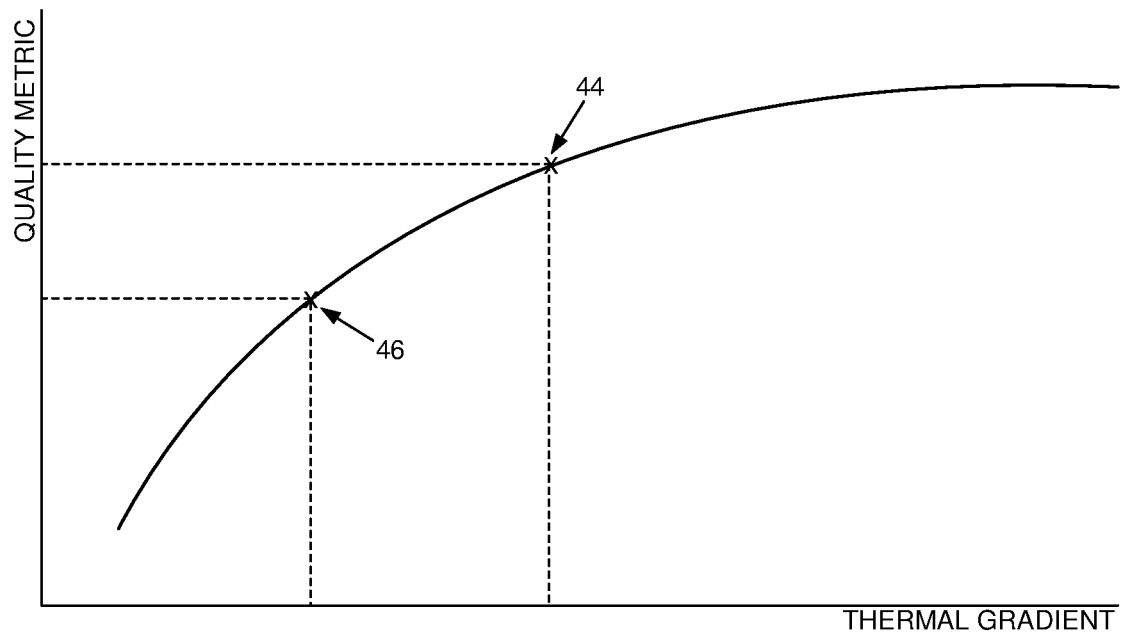
FIG. 4 shows a relationship between the thermal gradient and a quality metric of the recorded data according to an embodiment.

FIG. 4 shows a relationship between a quality metric of the write operations (e.g., a weighted sum signal-to-noise ratio (WsSNR), a bit error rate, a sector error rate, etc.) and the thermal gradient produced in the magnetic media by the NFT. Point 44 on the graph represents the initial thermal gradient produced by the NFT after calibrating the write parameters to achieve the target areal density (block 34 of FIG. 3). As the NFT degrades over time, there is a corresponding degradation in the thermal gradient as shown in FIG. 4 until reaching point 46 which represents failure of the NFT due to an excessive degradation of the write quality. In one embodiment, the quality metric (y axis of FIG. 4) of the write operations (e.g., WsSNR, bit error rate, sector error rate) may be a relatively noisy signal that may also be affected by parameters of the write operation other than a degrading NFT. Accordingly, degradation of a general quality metric of the write operations may not necessarily be a good indicator as to whether the NFT is failing, whereas in one embodiment degradation of the thermal gradient metric is typically associated with degradation of the NFT. In addition, the inventors have discovered there is a relatively high correlation between the rate of change (slope) of the thermal gradient and the operating life of the NFT. That is when the thermal gradient measurements exhibit a high rate of change (high slope), it typically means the NFT will exhibit a shorter operating life before failing.

Figure 5:
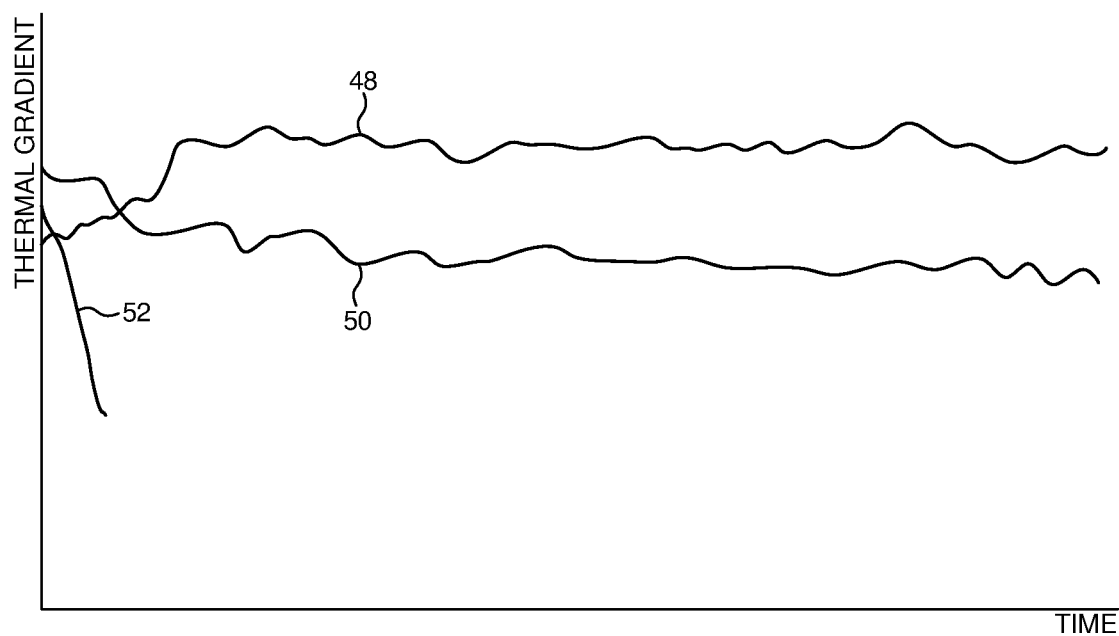
FIG. 5 shows a periodic thermal gradient measurement over time for three different heads, wherein in this embodiment failure of the NFT is predicted when a negative slope of the thermal gradient exceeds a threshold.

FIG. 5 shows example graphs of thermal gradient measurements over time for three different heads according to an embodiment. The first graph 48 shows a thermal gradient that is increasing over time which typically indicates a high grade NFT having a relatively long operating life. The second graph 50 shows a thermal gradient that is decreasing slowly over time which typically indicates a moderate grade NFT having a nominally long operating life. The third graph 52 shows a thermal gradient having a high negative rate of change (high negative slope) which typically indicates a low grade NFT that is likely to fail within a relatively short period of time. Although the third graph 52 in FIG. 5 shows the thermal gradient begins degrading sharply near the beginning of the NFT's life, in other embodiments the thermal gradient may be relatively constant in the beginning, with a sharper degradation at some point during the lifetime of the NFT indicating an oncoming failure. The slope of the thermal gradient may be generated in any suitable manner, and in one embodiment a raw slope measurement may be low pass filtered to generate the final slope measurement in order to attenuate noise in the failure prediction signal. In addition, the slope threshold for predicting a failure of the NFT (e.g., block 40 of FIG. 3) may be configured in any suitable manner, such as by evaluating the thermal gradient measurements for a number of different heads and correlating the failed NFTs with their corresponding thermal gradient slope in order to configure the failure prediction threshold for a family of data storage devices.

Any suitable technique may be employed in the above described embodiments to measure the thermal gradient produced in the magnetic media by the NFT. In addition, the thermal gradient measurement may include a down-track measurement and/or a cross-track measurement. For example, in one embodiment a down-track thermal gradient may be measured by modulating the laser power during a write operation and evaluating the readback signal to measure the shift in the locations of the resulting magnetic transitions due to the modulated size of the thermal spot. In another embodiment, a cross-track thermal gradient may be measured by modulating the laser power during a write operation and measuring the modulated width of the resulting data track using any suitable technique (e.g., using a micro-track based method). Another suitable technique for measuring a cross-track thermal gradient is disclosed in the above referenced U.S. patent application entitled "DATA STORAGE DEVICE MEASURING HAMR MEDIA DISTRIBUTIONS." In one embodiment, failure of the NFT may be predicted when the slope of either the down-track or the cross-track thermal gradient exceeds a corresponding threshold, and in another embodiment a failure may be predicted when the slope of both the down-track and the cross-track thermal gradients exceed a corresponding threshold.

Any suitable control circuitry may be employed to implement the above described embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power circuit(s) and/or a suitable preamp circuit(s) implemented as separate integrated circuits, integrated into the read channel or data storage controller circuit, or integrated into a SOC.

In one embodiment, the control circuitry comprises a microprocessor executing instructions, the instructions being operable to cause the microprocessor to perform at least some aspects described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, tape drives, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a magnetic media;
   a head actuated over the magnetic media, wherein the head comprises a laser and a near field transducer (NFT); and
   control circuitry configured to:
   periodically measure a thermal gradient produced in the magnetic media by the NFT;
   predict a failure of the NFT based on a slope of the thermal gradient measurements; and
   measure the thermal gradient by measuring a cross-track thermal gradient.

2. The data storage device as recited in claim 1, wherein the control circuitry is further configured to predict the failure of the NFT when an absolute value of the slope exceeds a threshold.

3. The data storage device as recited in claim 2, wherein the control circuitry is further configured to predict the failure of the NFT when the slope is negative.

4. The data storage device as recited in claim 1, wherein the control circuitry is further configured to:
   calibrate a control signal applied to the laser in order to achieve a target areal density of the magnetic media;
   periodically adjust the control signal to maintain a target quality metric; and
   after adjusting the control signal at least once, measure the thermal gradient.

5. A data storage device comprising:
   a magnetic media;
   a head actuated over the magnetic media, wherein the head comprises a laser and a near field transducer (NFT); and
   control circuitry configured to:
   periodically measure a parameter for the NFT;
   predict a failure of the NFT based on a slope of the parameter measurements;
   calibrate a control signal applied to the laser in order to achieve a target areal density of the magnetic media;
   periodically adjust the control signal to maintain a target quality metric; and
   after adjusting the control signal at least once, measure the parameter for the NFT.

6. The data storage device as recited in claim 5, wherein the measured parameter for the NFT comprises a thermal gradient produced in the magnetic media.

7. The data storage device as recited in claim 5, wherein the control circuitry is further configured to predict the failure of the NFT when an absolute value of the slope exceeds a threshold.

8. The data storage device as recited in claim 7, wherein the control circuitry is further configured to predict the failure of the NFT when the slope is negative.

9. The data storage device as recited in claim 6, wherein the control circuitry is further configured to measure the thermal gradient by measuring a cross-track thermal gradient.

10. The data storage device as recited in claim 6, wherein the control circuitry is further configured to measure the thermal gradient by measuring a down-track thermal gradient.

11. A data storage device comprising:
    a magnetic media;

a head actuated over the magnetic media, wherein the head comprises a laser and a near field transducer (NFT); and a means for periodically measuring a parameter for the NFT; and a means for predicting a failure of the NFT based on a slope of the parameter measurements, wherein the failure of the NFT is predicted when an absolute value of the slope exceeds a threshold.

12. The data storage device as recited in claim 11, wherein the measured parameter for the NFT comprises a thermal gradient produced in the magnetic media.

13. The data storage device as recited in claim 11, wherein the failure of the NFT is predicted when the slope is negative.

14. The data storage device as recited in claim 11, further comprising:
a means for calibrating a control signal applied to the laser in order to achieve a target areal density of the magnetic media;
a means for periodically adjusting the control signal to maintain a target quality metric; and
after adjusting the control signal at least once, a means for measuring the parameter for the NFT.

15. The data storage device as recited in claim 12, wherein the thermal gradient is measured by measuring a cross-track thermal gradient.

16. The data storage device as recited in claim 12, wherein the thermal gradient is measured by measuring a down-track thermal gradient.

17. A data storage device comprising:
a magnetic media;
a head actuated over the magnetic media, wherein the head comprises a laser and a near field transducer (NFT); and
control circuitry configured to:
periodically measure a thermal gradient produced in the magnetic media by the NFT;
predict a failure of the NFT based on a slope of the thermal gradient measurements; and
measure the thermal gradient by measuring a down-track thermal gradient.

* * * * *